United States Patent
Alspector et al.

(10) Patent No.: US 7,725,544 B2
(45) Date of Patent: May 25, 2010

(54) GROUP BASED SPAM CLASSIFICATION

(75) Inventors: Joshua Alspector, Chantilly, VA (US);
Aleksander Kolcz, Fairfax, VA (US);
Abdur Chowdhury, Oakton, VA (US)

(73) Assignee: AOL Inc., Dulles, VA (US)

( * ) Notice: Subject to any disclaimer, the term of this patent is extended or adjusted under 35 U.S.C. 154(b) by 1177 days.

(21) Appl. No.: 10/683,426

(22) Filed: Oct. 14, 2003

(65) Prior Publication Data
US 2004/0148330 A1    Jul. 29, 2004

Related U.S. Application Data

(60) Provisional application No. 60/442,124, filed on Jan. 24, 2003.

(51) Int. Cl.
*G06F 15/16* (2006.01)
(52) U.S. Cl. .................................. 709/206; 709/207
(58) Field of Classification Search ............... 709/206, 709/207
See application file for complete search history.

(56) References Cited

U.S. PATENT DOCUMENTS

| 5,835,087 | A | 11/1998 | Herz et al. |
| 6,073,142 | A | 6/2000 | Geiger et al. |
| 6,161,130 | A * | 12/2000 | Horvitz et al. ............ 709/206 |
| 6,167,434 | A | 12/2000 | Pang |
| 6,199,103 | B1 | 3/2001 | Sakaguchi et al. |
| 6,330,590 | B1 | 12/2001 | Cotten |
| 6,421,709 | B1 | 7/2002 | McCormick et al. |
| 6,453,327 | B1 | 9/2002 | Nielsen |
| 6,507,866 | B1 * | 1/2003 | Barchi ..................... 709/207 |
| 6,714,967 | B1 | 3/2004 | Horvitz |
| 6,732,149 | B1 * | 5/2004 | Kephart .................. 709/206 |
| 6,845,374 | B1 * | 1/2005 | Oliver et al. ................ 707/5 |
| 6,901,398 | B1 | 5/2005 | Horvitz et al. |
| 6,978,419 | B1 * | 12/2005 | Kantrowitz ............... 715/209 |
| 7,016,939 | B1 * | 3/2006 | Rothwell et al. .......... 709/206 |
| 7,062,498 | B2 | 6/2006 | Al-Kofahi et al. |
| 7,089,241 | B1 | 8/2006 | Alspector et al. |
| 7,200,606 | B2 | 4/2007 | Elkan |
| 7,249,175 | B1 | 7/2007 | Donaldson |
| 2002/0055940 | A1 | 5/2002 | Elkan |
| 2002/0083068 | A1 * | 6/2002 | Quass et al. ............. 707/100 |

(Continued)

OTHER PUBLICATIONS

Kolcz et al. SVM-based Filtering of E-mail Spam with Content-Specific Misclassification Costs. Dated 2001.*

(Continued)

*Primary Examiner*—Thu Nguyen
*Assistant Examiner*—Hieu T Hoang
(74) *Attorney, Agent, or Firm*—Fish & Richardson P.C.

(57) ABSTRACT

An e-mail filter is used to classify received e-mails so that some of the classes may be filtered, blocked, or marked. The e-mail filter may include a classifier that can classify an e-mail as belonging to a particular class and an e-mail grouper that can detect substantially similar, but possibly not identical, e-mails. The e-mail grouper determines groups of substantially similar e-mails in an incoming e-mail stream. For each group, the classifier determines whether one or more test e-mails from the group belongs to the particular class. The classifier then designates the class to which the other e-mails in the group belong based on the results for the test e-mails.

24 Claims, 7 Drawing Sheets

U.S. PATENT DOCUMENTS

| | | | |
|---|---|---|---|
| 2002/0116463 | A1 | 8/2002 | Hart |
| 2002/0116641 | A1 | 8/2002 | Mastrianni |
| 2002/0147754 | A1 | 10/2002 | Dempsey et al. |
| 2002/0181703 | A1 | 12/2002 | Logan et al. |
| 2002/0199095 | A1 | 12/2002 | Bandini et al. |
| 2003/0037041 | A1 | 2/2003 | Hertz |
| 2003/0101181 | A1 | 5/2003 | Al-Kofahi et al. |
| 2003/0110181 | A1* | 6/2003 | Schuetze et al. ........ 707/103 R |
| 2004/0029087 | A1 | 2/2004 | White |
| 2004/0128355 | A1* | 7/2004 | Chao et al. .................. 709/206 |
| 2006/0190481 | A1 | 8/2006 | Alspector et al. |

OTHER PUBLICATIONS

Broder et al. Syntactic clustering of the web. 1997. http://www.hpl.hp.com/techreports/Compaq-DEC/SRC-TN-1997-015.pdf.*

H. Drucker et al.; "Support Vector Machines for Spam Categorization", IEEE Transactions on Neural Networks, vol. 10, No. 5, Sep. 1999.

M. Hearst et al., "Support Vector Machines", IEEE Intelligent Systems, Jul./Aug. 1998.

T. Joachims, "Text Categorization with Support Vector Machines: Learning with Many Relevant Features", University of Dortmund, Computer Science Dept., LS-8 Report 23, 1998.

M. Marvin, "Announce: Implementation of E-mail Spam Proposal", News.admin.net-abuse.misc, Aug. 3, 1996.

H. Zaragoza et al., Proceedings of the workshop "Machine Learning and Textual Information Access", 4$^{th}$ European Conference on Principles and Practice of Knowledge Discovery in Databases (PKDD-2000), Lyon, France, Sep. 2000, pp. 1-13.

R. Hall, "A Countermeasure to Duplicate-detecting Anti-spam Techniques", AT&T Labs, Technical Report 99.9.1, 1999.

S. Hird, "Technical Solutions for Controlling Spam", Proceedings of AUUG2002, Melbourne, 4-6, Sep. 2002.

Bart Massey et al., "Learning Spam: Simple Techniques For Freely-Available Software", computer Science Dept., Portland, OR USA, 2003, pp. 1-14.

"Better Bayesian Filtering", www.paulgraham.com/better.html, Jan. 2003, pp. 1-11.

A. Kolcz and J. Alspector, "SVM-based Filtering of E-mail Spam with Content-specific Misclassification Costs," *TextDM'2001 (IEEE ICDM-2001 Workshop on Text Mining)*, San Jose, CA 2001.

J. Dudley, "Telstra targets Net spammers", http://www.news.com.au/common, Dec. 2, 2003, pp. 1-2.

International Search Report dated Jan. 13, 2004.for International Application No. PCT/US04/01784.

R. Hall, "A Countermeasure to Duplicate-detecting Anti-spam Techniques", AT&T Labs Technical Report 99.9.1, 1999.

M. Marvin, "Announce: Implementation of E-mail Spam Proposal", news.admin.net-abuse.misc, Aug. 3, 1996.

S. Hird, "Technical Solutions for Controlling Spam in the proceedings of AUUG2002", Melbourne, Sep. 4-6, 2002.

H. Drucker et al., "Support Vector Machines for Spam Categorization", IEEE Transactions on Neural Networks, vol. 10, No. 5, Sep. 1999.

"Learning to Filter Spam E-Mail: Comparison of a Naïve Bayesian and a Memory-Based Approach," 4$^{th}$ European Conference on Principles and Practice of Knowledge Discovery in Databases (PKDD-2000), H. Zaragoza, P. Gallinari and M. Jarman (Eds.), Lyon, France, Sep. 2000, pp. 1-12.

T. Joachims, Text Categorization with Support Vector Machines: Learning with Many Relevant Features, University of Dortmund, Computer Science Dept., LS-8 Report 23, 1998.

http://www.palimine.net/qmail/tarpit.html, "Tarpitting with qmail-smtpd", p. 1.

Dale Woolridge et al., "qmail-spamthrottle (5)—the spam throttle mechanism", http://spamthrottle.qmail.ca/man/qmail-spamthrottle.5.html, pp. 1-4.

P. Bennett, *Assessing the calibration of naive bayes' posterior estimates*, tech. report, Dept. of Computer Science, School of Science, Carnegie Mellon University 2000.

L. Breiman, *Bagging predictors*, Machine Learning, 24 (1996), pp. 123-140, 1996.

L. Breiman, *Out-of-bag estimation*, tech. report, Department of Statistics, University of California Berkeley, 1996.

M. Brown, W. N. Grundy, D. Lin, N. Cristianini, C. Sugnet, M. Ares and D. Haussler, *Support vector machine classification of microarray gene expression data*, Tech. Report UCSC-CRL-99-09, University of California, Santa Cruz, 1999.

P. Domingos, *Meta Cost: A general method for making classifiers cost-sensitive*, in Proceedings of the Fifth International Conference of Knowledge Discovery and Data Mining, ACM Press, 1999, pp. 155-164.

S. Dumais, J. Platt, D. Heckerman, and M. Sahami, *Inductive learning algorithms and representations for text categorization*, in Proceedings of 7$^{th}$ International Conference on Information and Knowledge Management, 1998, pp. 229-237.

T. Joachims, *Text categorization with support vector machines: Learning with many relevant features*, in Proceedings of the Tenth European Conference on Machine Learning (ECML-98), 1998, pp. 137-142.

C. Lin, *Formulations of support vector nyetfies: A note from an optimization point of view*, Neural Computation, 13 (2001), pp. 307-317, 2001.

D. Margineantu and T. Dietterich, *Bootstrap methods for the cost-sensitive evaluation of classifiers*, in Proceedings of the 2000 International Conference on Machine Learning, ICML-2000, 2000.

K. Monk, M. Imhoff, P. Brockhausen, T. Joachims, and U. Gather, *Knowledge discovery and knowledge validation in intensive care*, Artifical Intelligence in Medicine, 19 (2000), pp. 225-249.

J. Platt, *Fast training of support vector machines using sequential minimal optimization*, in Advances in Kernel Methods —Support Vector Learning, B. Schölkopf, C. Burges, and A. Smola, eds., MIT Press, 1999.

V. N. Vapnik, *Statistical Learning Theory*, Chapter 10, John Wiley, New York, 1998.

G. Wahba, *Support vector machines, reproducing kernel Hilbert spaces and the randomized GACV*, in Advances in Kernel Methods: Support Vector Learning, B. Schölkopf, C. Burges, and A. Smola, eds., MIT Press, 1999, pp. 69-88.

B. Zadrozny and C. Elkan, *Learning and making decisions when costs and probabilities are both unknown*, Tech. Report CS2001-0664, UCSD, 2001.

I. Androutsopoulos, J. Koutsias, K. Chandrinos, G. Paliouras, and C. Spyropoulos. An Evaluation of Naïve Bayesian Anti-Spam Filtering. In G. Potamias, V. Moustakis, and M. van Someren, editors, *Proceedings of the Workshop on Machine Learning in the New Information Age:11$^{th}$ European Conference on Machine Learning (ECML 2000)*, pp. 9-17. 2000.

I. Androutsopoulos, J. Koutsias, K. Chandrinos, G. Paliouras, and C. Spyropoulos. An Experimental Comparison of Naïve Bayesian and Keyword-Based Anti-Spam Filtering with Encrypted Personal E-mail Messages. In N. Belkin, P. Ingwersen, and M. Leong, editors, *Proceedings of the 23$^{rd}$ Annual International ACM SIGIR Conference on Research and Development in Information Retrieval (SIGIR 2000)*, pp. 160-167. 2000.

I. Androutsopoulos, G. Paliouras, V. Karkaletsis, G. Sakkis, C. Spyropoulos, and P. Stamatopoulos. Learning to Filter Spam E-Mail: A Comparison of a Naïve Bayesian and a Memory-Based Approach. In H. Zaragoza, P. Gallinari, and M. Rajman, editors, *Proceedings of the Workshop on Machine Learning and Textual Information Access, 4$^{th}$ European Conference on Principles and Practice of Knowledge Discovery in Databases (PKDD 2000)*, pp. 1-13. 2000.

A. Bradley. The use of the area under the ROC curve in the evaluation of machine learning algorithms. *Pattern Recoginization*, 30(7):1145-1159, 1997.

S. Brin, J. Davis, and H. Garcia-Molina. Copy detection mechanisms for digital documents. In *Proceeding of SIGMOD*, pp. 398-409, 1995.

Broder, On the resemblance and containment of documents. *SEQS: Sequences '91*, 1998.

C. Buckley, C. Cardie, S. Mardisa, M. Mitra, D. Pierce, K. Wagstaff, and J. Waltz. The smart/empire tipster ir system. In *TIPSTER Phase III Proceedings*. Morgan Kaufmann, 2000.

A. Chowdhury, O. Frieder, D. A. Grossman, and M. C. McCabe. Collection statistics for fast duplicate document detection. *ACM Transactions on Information Systems*, 20(2):171-191, 2002.

W. Cohen. Fast effective rule induction. In *Proceedings of the Twelfth International Conference on Machine Learning*, 1995.

W. Cohen. Learning Rules that Classify E-Mail. In *Proceedings of the 1996 AAAI Spring Symposium on Machine Learning in Information Access*, 1996.

J. Diederich, J. Kindermann, E. Leopold, and G. Paass. Authorship Attribution with Support Vector Machines. In *Proceedings of the Learning Workshop*, Snowbird, Utah, 2000.

Drucker, D. Wu, and V. Vapnik. Support Vector Machines for Spam Categorization. *IEEE Transactions on Neural Networks*, 10(5):1048-1054, 1999.

S. Eyheramendy, D. Lewis, and D. Madigan. On the Naïve Bayes model for text categorization. In *Proceedings of the Ninth International Workshop on Artificial Intelligence and Statistics*, 2003.

T. Fawcett. ROC graphs. Notes and practical considerations. Technical Report HPL-2003-4, HP Labs, 2003.

N. Heintze. Scalable document fingerprinting. In 1996 *USENIX Workshop on Electronic Commerce*, Nov. 1996.

J. G. Hidalgo, M. M. Lopez, and E. P. Sanz. Combining Text and Heuristics for Cost-Sensitive Spam Filtering. In *Proceedings of the Fourth Computational Natural Language Learning Workshop, CoNLL-2000*, Lisbon, Portugal, 2000. Association for Computational Linguistics.

T. C. Hoad and J. Zobel. Methods for identifying versioned and plagiarized documents. *Journal of the American Society for Information Science and Technology*, 2002.

H. Kaitarai. Filtering Junk E-Mail: A Performance Comparison between Genetic Programming and Naïve Bayes. Technical Report (presented at the Fail 1999 Meeting of the CMU Text Learning Group), Department of Electrical and Computer Engineering, University of Waterloo, Nov. 1999.

J. Kleinberg. Bursty and hierarchical structure in streams. In *Proceedings of the Eight ACM SIGKDD International Conference on Knowledge Discovery and Data Mining (KDD 2002)*, 2002.

D. D. Lewis. Naïve (Bayes) at forty: the independence assumption in information retrieval. In *Proceedings of the $10^{th}$ European Conference on Machine Learning*, pp. 4-15, 1998.

Y. Li, H. Zaragoza, R. Herbrich, J. Shawe-Taylor, and J. Kandola. The perception algorithm with uneven margins. In *Proceedings of ICML 2002*, pp. 379-386, 2002.

A. McCallum and K. Nigam. A comparison of event models for Naïve Bayes text classification. In *Proceedings of the AAAI-98 Workshop on Learning for Text Categorization*, 1998.

A. McCallum, K. Nigam, and L. Ungar. Efficient clustering of high-dimensional data sets with application to reference matching. In *Proceedings of the Sixth ACM SIGKDD International Conference on Knowledge Discovery and Data Mining (KDD 2000)*, 2000.

P. Pantel and D. Lin. SpamCop: A Spam Classification & Organization Program. In *Learning for Text Categorization: Papers from the 1998 Workshop*, Madison, Wisconsin, 1998. AAAI Technical Report WS-98-05.

F. Provost and T. Fawcett. Robust Classification for Imprecise Environments. *Machine Learning*, 42:203-231, 2001.

J. Provost. Naïve-Bayes vs . Rule-Learning in Classification of Email. Technical report, Dept. of Computer Sciences at the U. of Texas at Austin, 1999.

M. Redmond and B. Adelson. AlterEgo E-Mail Filtering Agent —Using CBR as a Service. In *Proceedings of the Workshop on Case-Based Reasoning Integrations at the National Conference on Artificial Intelligence (AAAI-98)*. AAAI Press 1998.

J. Rennie. Ifile: An Application of Machine Learning to E-mail Filtering. In *Proceedings of the KDD-2000 Workshop on Text Mining*, 2000.

J. D. M. Rennie. Improving multi-class text classification with Naïve Bayes. Technical Report AITR-2001-004, Massachusetts Institute of Technology, 2001.

M. Sahami, S. Dumais, D. Beckerman, and E. Horvitz. A Bayesian Approach to Filtering Junk E-Mail. In *Proceedings of the AAAI-98 Workshop on Learning for Text Categorization*, 1998.

G. Sakkis, I. Androutsopoulso, G. Paliouras, V. Karkaletsis, C. Spyropoulos, and P. Stamatopoulos. Stacking Classifiers for Anti-Spam Filtering of E-Mail. In L. Lee and D. Harman editors, *Proceedings of the $6^{th}$ Conference on Empirical Methods in Natural Language Processing (EMNLP 2001)*, pp. 44-50. Carnegie Mellon University, 2001.

G. Salton, C, Yang, and a. Wong. A vector-space model for automatic indexing. *Communications of the ACM, 18, 1975*.

M. Sanderson. Duplicate detection in the Reuters collection. Technical Report TR-1997-5, Department of Computing Science, University of Glasgow, 1997.

S. Sarawagi and A. Bhamidipaty. Interactive deduplication using active learning. In *Proceedings of the Eighth ACM SIGKDD International Conference on Knowledge Discovery and Data Mining (KDD 2002)*, 2002.

G. Schohn and D. Cohn. Less is more: Active learning with support vector machines. In *Proc. $17^{th}$ International Conf. on Machine Learning*, pp. 839-846. Morgan Kaufmann, San Francisco, CA, 2000.

R. Segal and J. Kephart. Mailcat: An Intelligent Assistant for Organizing E-Mail. In *Proceedings of the Third International Conference on Autonomous Agents*, 1999.

R. Segal and J. Kephart. Incremental Learning in SwiftFile. In *Proceedings of the Seventh International Conference on Machine Learning*, 2000.

N. Shivakumar and H. Garcia-Monlina, SCAM: A copy detection mechanism for digital documents. *In Proceedings of $2^{nd}$ International Conference in Theory and Practice of Digital Libraries (DL'95)*, Austin, Texas 1995.

G. Weiss and F. Provost. The effect of class distribution on classifier learning: An empirical study. Technical Report ML-TR-44, Department of Computer Science, Rutgers University, 2002.

W. E. Winkler. The state of record linkage and current research problems. Technical report, Statistical Research Division, U.S. Bureau of Census, Washington, DC, 1999.

Y. Yang and J. P. Pedersen. A comparative study on feature selection in text categorization. In *Proceedings of the Fourteenth International Conference on Machine Learning (ICML'97), pp 412-420, 1997*.

Office Action issued in 10/740,821 on Feb. 24, 2005, 21 pages.

Office Action issued in 10/740,821 on Jul. 25, 2005, 24 pages.

Office Action issued in 11/380,375 on Oct. 29, 2008, 19 pages.

Office Action issued in 11/380,375 on Mar. 31, 2008, 17 pages.

Office Action issued in 11/380,375 on Jun. 15, 2009, 21 pages.

International Search Report issued in PCT/US2004/001788 on Mar. 10, 2005, 4 pages.

Final Office Action for U.S. Appl. No. 11/380,375 dated Jan. 20, 2010, 16 pages.

* cited by examiner

GROUP BASED SPAM CLASSIFICATION

CLAIM OF PRIORITY

This application claims priority under 35 USC §119(e) to U.S. Provisional Patent Application Ser. No. 60/442,124, filed on Jan. 24, 2003, the entire contents of which are hereby incorporated by reference.

TECHNICAL FIELD

This description relates to spam filtering.

BACKGROUND

With the advent of the Internet and a decline in computer prices, many people are communicating with one another through computers interconnected by networks. A number of different communication mediums have been developed to facilitate such communications between computer users. One type of prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mails). These are akin to junk mail sent through the postal service. However, because spam e-mail requires neither paper nor postage, the costs incurred by the sender of spam e-mail are quite low when compared to the costs incurred by conventional junk mail senders. Due to this and other factors, e-mail users now receive a significant amount of spam e-mail on a daily basis. Spam e-mail impacts both e-mail users and e-mail providers. For e-mail users, spam e-mail can be disruptive, annoying, and time consuming. For an e-mail service provider, spam e-mail represents tangible costs in terms of storage and bandwidth usage. These costs may be substantial when large numbers of spam e-mails are sent.

SUMMARY

In one aspect, received e-mails are clustered into groups of substantially similar e-mails. A set of one or more test e-mails is selected from at least one of the groups. The proportion of spam e-mails in the set of test e-mails is determined. The e-mails in the group is classified as spam when the proportion of spam e-mails in the set of test e-mails exceeds a predetermined threshold proportion.

Implementations of this aspect may include one or more of the following features. For example, selecting the set of one or more test e-mails may include selecting a sufficient number of test e-mails for the set such that the proportion of spam e-mails in the set accurately reflects a proportion of spam e-mails in the at least one group.

Clustering may include collecting a set of received e-mails and performing duplicate detection on the set of received e-mails to cluster the set of received e-mails into groups of substantially similar e-mails. Alternatively, clustering may include performing duplicate detection on a received e-mail when the e-mail is received to determine if the received e-mail is substantially similar to e-mails in an existing group of substantially similar e-mails; adding the received e-mail to the existing group of substantially similar e-mails when the received e-mail is substantially similar to e-mails in the existing group; and using the received e-mail to start a new group of substantially similar e-mails when the received e-mail is not substantially similar to e-mails in the existing group of substantially similar e-mails.

A signature of the at least one group may be saved when the proportion of spam e-mails in the set exceeds the predetermined threshold proportion. The signature then may be used to determine whether a newly received e-mail is substantially similar to the e-mails in the at least one group and the new e-mail may be classified as spam when the new e-mail is substantially similar to the e-mails in the at least one group.

When the substantially similar e-mails in the at least one group are part of a larger population of substantially similar e-mails, a size of the at least one group may be selected such that a proportion of spam e-mails in the at least one group accurately reflects a proportion of spam e-mails in the larger population.

The predetermined threshold may be based on a misclassification cost of misclassifying spam e-mail as non-spam e-mail and a misclassification cost of misclassifying non-spam e-mail as spam e-mail.

In another aspect, received e-mails are clustered into groups of substantially similar e-mails. One or more test e-mails are selected from at least one of the groups and a class for the one or more test e-mails is determined. At least one non-test e-mail in the at least one group is classified based on the determined class of the one or more test e-mails.

Implementations of this aspect may include one or more of the following features. For example, clustering may include performing duplicate detection on a received e-mail when the e-mail is received to determine if the received e-mail is substantially similar to e-mails in an existing group of substantially similar e-mails; adding the received e-mail to the existing group of substantially similar e-mails when the received e-mail is substantially similar to e-mails in the existing group; and using the received e-mail to start a new group of substantially similar e-mails when the received e-mail is not substantially similar to e-mails in the existing group of substantially similar e-mails. Alternatively, clustering may include collecting a set of received e-mails and performing duplicate detection on the set of received e-mails to cluster the set of received e-mails into groups of substantially similar e-mails.

Duplicate detection may be performed on a newly received e-mail to determine if the new e-mail is substantially similar to the e-mails in the at least one group and the new e-mail may be classified based on the class of the one or more test e-mails when the new e-mail is substantially similar to the e-mails in the at least one group.

When the substantially similar e-mails in the at least one group are part of a larger population of substantially similar e-mails, a size for the at least one group may be selected such that a proportion of the e-mails in the at least one group belonging to a particular class accurately reflects a proportion of the e-mails in the larger population that belong to the particular class.

Classifying at least one non-test e-mail may include classifying the at least one non-test e-mail into a particular class when a proportion of the test e-mails belonging to the particular class exceeds a predetermined threshold proportion. Selecting the test e-mails may include selecting a sufficient number of test e-mails such that a proportion of the test e-mails belonging to the particular class accurately reflects a proportion of the e-mails in the at least one group that belong to the particular class. The particular class may be spam. The predetermined threshold is based on a misclassification cost of misclassifying spam e-mail as non-spam e-mail and a misclassification cost of misclassifying non-spam e-mail as spam e-mail.

Determining a class for the one or more test e-mails may include determining whether the one or more e-mails are spam e-mails such that spam e-mail in the received e-mails can be filtered.

Implementations of the described techniques may include hardware, a method or process, or computer software on a computer-accessible medium.

The details of one or more implementations are set forth in the accompanying drawings and the description below. Other features will be apparent from the description and drawings, and from the claims.

DETAILED DESCRIPTION

The classification techniques are described as being applied to e-mail spam filtering. However, the techniques may be used for spam filtering in other messaging media, including both text and non-text media. For example, spam may be sent using instant messaging or short message service (SMS), or may appear on Usenet groups. Similarly, the techniques may be applied to filter spam sent in the form of images, sounds, or video, for instance. Moreover, the techniques described may be applied to classification problems other than e-mail filtering.

In general, an e-mail filter is used to classify received e-mails so that some of the classes may be filtered, blocked, or marked. The e-mail filter may include a classifier that can classify an e-mail as belonging to a particular class and an e-mail grouper that can detect substantially similar, but possibly not identical, e-mails. The e-mail grouper determines groups of substantially similar e-mails in an incoming e-mail stream. For each group, the classifier determines whether one or more test e-mails from the group belongs to the particular class. The classifier then designates the class to which the other e-mails in the group belong based on the results for the test e-mails.

Exemplary Hardware Environment

Figure 1:
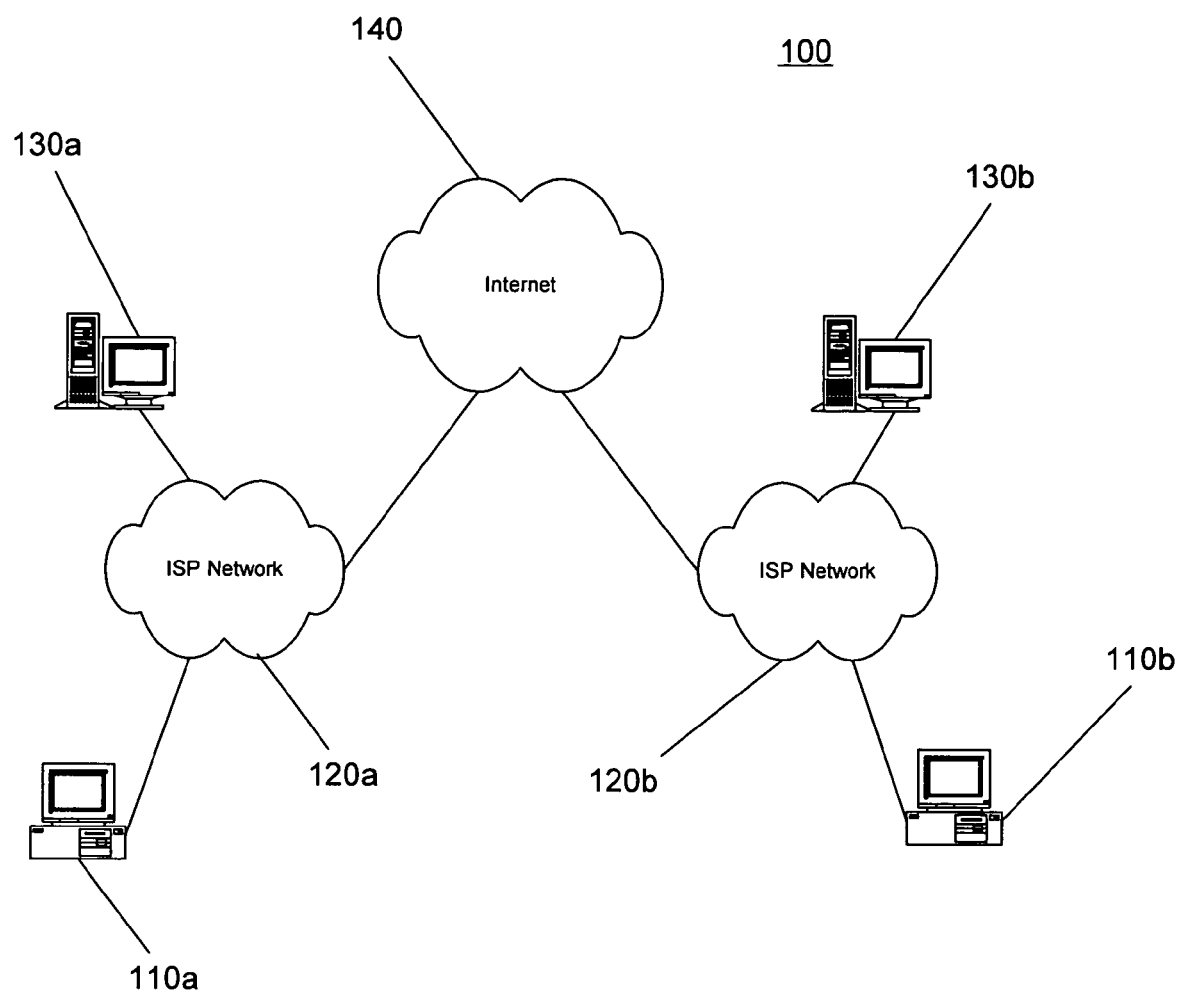
FIG. 1 is a block diagram of an exemplary networked computing environment that supports e-mail communications and in which spam filtering may be performed.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, networks 120a or 120b may be any network, e.g. a corporate network. Clients 110a and 110b may be connected to the respective ISP networks 120a and 120b through various communication channels such as a modem connected to a telephone line (using, for example, serial line internet protocol (SLIP) or point-to-point protocol (PPP)) or a direct network connection (using, for example, transmission control protocol/internet protocol (TCP/IP)). E-mail or other messaging servers 130a and 130b also are connected to ISP networks 120a and 120b, respectively. ISP networks 120a and 120b are connected to a global network 140. (e.g., the Internet) such that a device on one ISP network can communicate with a device on the other ISP network. For simplicity, only two ISP networks 120a and 120b have been illustrated as connected to Internet 140. However, there may be a large number of such ISP networks connected to Internet 140. Likewise, many e-mail servers and many client systems may be connected to each ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device such as a personal digital assistant (PDA), a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each of client systems 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network including, e.g., a corporate LAN. Networks 120a and 120b may include multiple networks or subnetworks, each of which may include, for example, a wired or wireless data pathway.

Each of e-mail servers 130a and 130b may handle e-mail for thousands or more e-mail users connected to ISP network 110a or 110b. Each e-mail server may handle e-mail for a single e-mail domain (e.g., aol.com), for a portion of a domain, or for multiple e-mail domains. While not shown, there may be multiple, interconnected e-mail servers working together to provide e-mail service for e-mail users of an ISP network.

An e-mail user, such as a user of client system 110a or 110b, typically has one or more e-mail mailboxes on an e-mail system, which may incorporate e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client system 110a or 110b to retrieve the e-mail from e-mail server 130a, 130b and view the e-mail.

The e-mail client programs executing on client systems 110a and 110b also may allow one of the users to send e-mail to an e-mail address. For example, the e-mail client program executing on client system 110a may allow the e-mail user of client system 110a (the sending user) to compose an e-mail message and address the message to a recipient address, such as an e-mail address of the user of client system 110b. When the sender indicates the e-mail is to be sent to the recipient address, the e-mail client program executing on client system 110a communicates with e-mail server 130a to handle the sending of the e-mail to the recipient address. For an e-mail addressed to an e-mail user of client system 110b, for example, e-mail server 130a sends the e-mail to e-mail server 130b. E-mail server 130b receives the e-mail and places it in the mailbox that corresponds to the recipient address. The user of client system 110b may then retrieve the e-mail from e-mail server 130b, as described above.

In an e-mail environment such as that shown, a spammer typically uses an e-mail client program to send similar spam e-mails to hundreds, if not millions, of e-mail recipients. For example, a spammer may target hundreds of recipient e-mail addresses serviced by e-mail server 130b on ISP network 120b. The spammer may maintain the list of targeted recipient addresses as a distribution list. The spammer may use the e-mail client program to compose a spam e-mail and instruct the e-mail client program to use the distribution list to send the spam e-mail to the recipient addresses. The e-mail is then sent to e-mail server 130b for delivery to the recipient addresses. Thus, in addition to receiving legitimate e-mails, e-mail server 130b also may receive large quantities of spam e-mail, particularly when many hundreds of spammers target e-mail addresses serviced by e-mail server 130b.

E-mail systems tend to be used by any given spammer to send large numbers of substantially similar, although non-identical, e-mails. While the content of each spam e-mail contains essentially the same message, the content of each e-mail is normally varied to a degree. For example, mass e-mailings are often personalized by including the recipient user's first/last name or other personal information.

Also, spammers may purposefully randomize their e-mails so as to foil conventional spam detection schemes, such as those based on matching exact textual strings in the e-mail. Usually, the core of the e-mail remains the same, with random or neutral text added to confuse such "exact-match" spam filters. Often the extra text is inserted in such a way that it is not immediately visible to the users (e.g., when the font has the same color as the background). Other randomization strategies of spammers include: appending random character strings to the subject line of the e-mail, changing the order of paragraphs, or randomizing the non-alphanumeric content.

Overview of E-Mail Classifier

Figure 2:
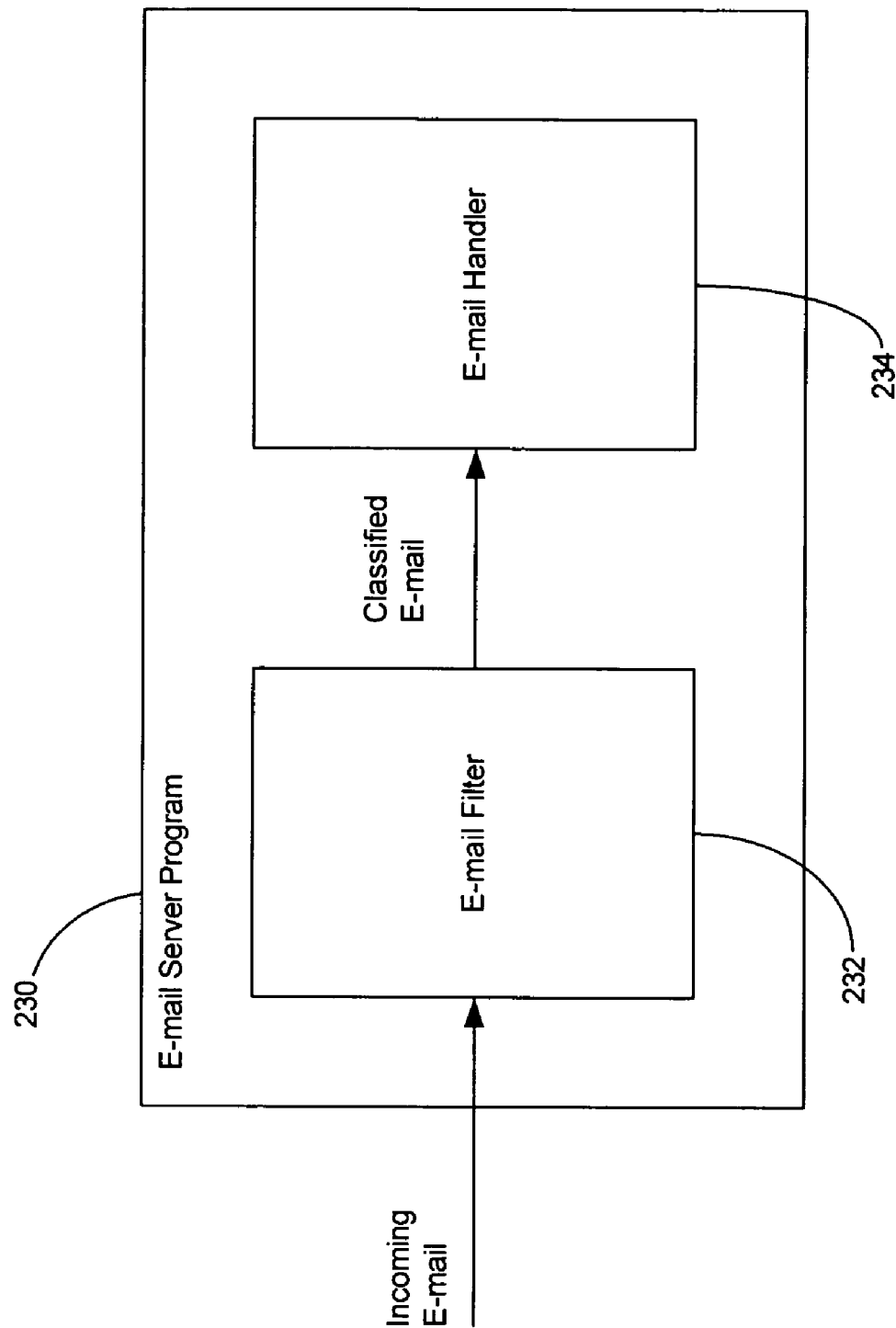
FIG. 2 is a high-level functional block diagram of an e-mail server program that may execute on an e-mail server to provide large-scale spam filtering.

FIG. 2 is a high-level functional block diagram of an e-mail server program 230 that may execute on an e-mail system, which may incorporate e-mail server 130a or 130b, to provide large-scale spam filtering. E-mail server program 230 includes an e-mail filter 232 and a mail handler 234. During operation, the incoming e-mail arriving at e-mail server program 230 is passed to e-mail filter 232. E-mail filter 232 classifies the e-mail accordingly (i.e., as spam or legitimate) and forwards the e-mail to mail handler 234.

"Classifying" a message does not necessarily have to include explicitly marking something as belonging to a class, rather, classifying may simply include providing the message with a spam or other class score. A message then may be handled differently based on its score. For example, e-mail filter 232 may determine a spam score for an e-mail, where the score is indicative of the likelihood that the e-mail is a spam e-mail. That score then may be compared to a classification threshold and, based on the classification, the e-mail may be marked as spam or legitimate accordingly. Alternatively, in some implementations, e-mail filter 232 may determine the spam score and assign the score to the e-mail, without explicitly labeling the e-mail as spam. Then, the e-mail may be handled according to its spam score. For example, a message may be displayed differently based on the spam or other class score. A first message, for instance, may be displayed in a darker shade of red (or other color) than a second message if the spam score of the first message is higher than the spam score of the second message (assuming a higher score indicates a greater chance the message is spam).

Once classified, mail handler 234 handles the e-mail in a manner that depends on the policies set by the e-mail service provider. For example, mail handler 234 may delete e-mails marked as spam, while delivering e-mails marked as legitimate to an "inbox" folder of the corresponding e-mail account. Alternatively, e-mail labeled as spam may be delivered to a "spam" folder instead of being deleted.

Figure 3:
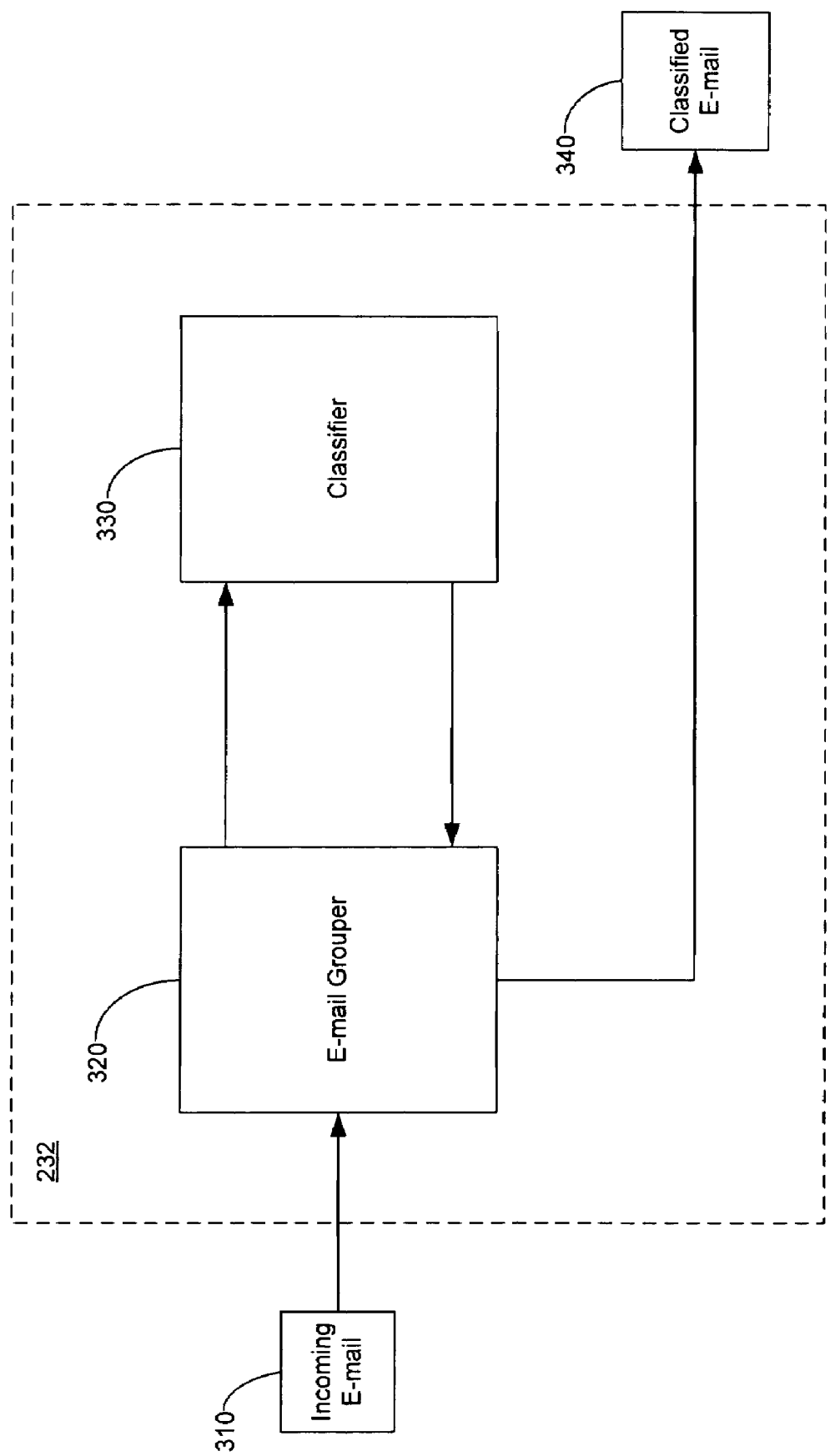
FIG. 3 is a functional block diagram of an e-mail filter.

FIG. 3 is a functional block diagram of one implementation of e-mail filter 232. Filter 232 includes a e-mail grouper 320 and a classifier 330. In general, e-mail grouper 320 determines groups of substantially similar e-mails in an incoming e-mail stream 310. E-mail grouper 320 may be implemented using a duplicate detector that detects substantially similar e-mails. For each group, classifier 330 classifies one or more test e-mails from the group, (e.g., determines whether the one or more e-mails are spam). While one test e-mail for each group may be used, using more than one test e-mail for each group may decrease the misclassification costs, as described further below. Based on the classifier's results for the test e-mails, the e-mails in the group are classified as spam or legitimate. The classified e-mail 340 then is forwarded to mail handler 234.

A number of different techniques may be used to implement classifier 330. For example, a human reviewer can review and classify the test e-mails. Alternatively, classifier 330 may be a duplicate detector that compares the test e-mails to a collection of known spam e-mails (collected, e.g., through customer complaints) to determine if the test emails are substantially similar to any e-mails in the collection. Those test e-mails that are similar to ones in the collection are then classified as spam. Those that are not similar are classified as legitimate. As another alternative, classifier 330 may be implemented using a probabilistic classification technique. For example, classifier 330 may be a support vector machine (SVM), a Naïve Bayesian classifier, or a limited dependence Bayesian classifier.

E-mail grouper 320 may be implemented using duplicate detection techniques for detecting substantially similar documents. For example, e-mail grouper 320 may be implemented using the I-Match approach that is described by Chowdhury et al. in "Collection Statistics For Fast Duplicate Document Detection," *ACM Transactions on Information Systems*, 20(2):171-191, 2002. The I-Match approach produces a hash representation of a document that may be used to represent the content of the document while still providing for non-exact matching. In particular, each document is reduced to a feature vector and term collection statistics are used to produce a binary feature selection-filtering agent. The filtered feature vector is then hashed to a single value that matches the value for all documents that produced the identical filtered feature vector, thus producing an efficient mechanism for duplicate detection.

Other duplicate detection approaches may be used. In general, current duplication detection techniques can be roughly classed as similarity-based techniques or fingerprint-based techniques. In similarity-based techniques, two documents are considered identical if their distance (according to a measure such as the cosine distance) falls below a certain threshold. Some similarity-based techniques are described in C. Buckley et al., *The Smart/Empire Tipster IR System*, in TIPSTER Phase III Proceedings, Morgan Kaufmann, 2000; T. C. Hoad & J. Zobel, *Methods of Identifying Versioned and Plagaiarised Documents*, Journal of the American Society for Information Science and Technology, 2002; and M. Sanderson, *Duplicate Detection in the Reuters Collection*, Tech. Report TR-1997-5, Department of Computing Science, University of Glasgow, 1997. In fingerprint-based techniques, two documents are considered identical if their projections onto a set of attributes are the same. Some fingerprint-based techniques are described in S. Brin et al., *Copy Detection Mechanisms for Digital Documents*, in Proceedings of SIGMOD, 1995, pp. 398-409; N. Heintze, *Scalable Document Fingerprinting*, in 1996 USENIX Workshop on Electronic Commerce, November 1996; and Broder, *On the Resemblance and Containment of Documents*, SEQS: Sequences '91, 1998.

In general, e-mail filter 232 may operate with reduced overall system costs compared to e-mail filters that evaluate each e-mail that is classified. However, the implementation of e-mail grouper 320 and classifier 330 may affect the overall system costs. Thus, the exact implementation of e-mail grouper 320 and classifier 330 may depend on a target cost for the expected overall system costs. In addition, for a given implementation of e-mail grouper 320 and classifier 330, parameters of e-mail filter 232, such as the number of test e-mails and the size of the groups, may be chosen to reduce the expected overall systems costs.

Operation of E-Mail Classifier

Figure 4:
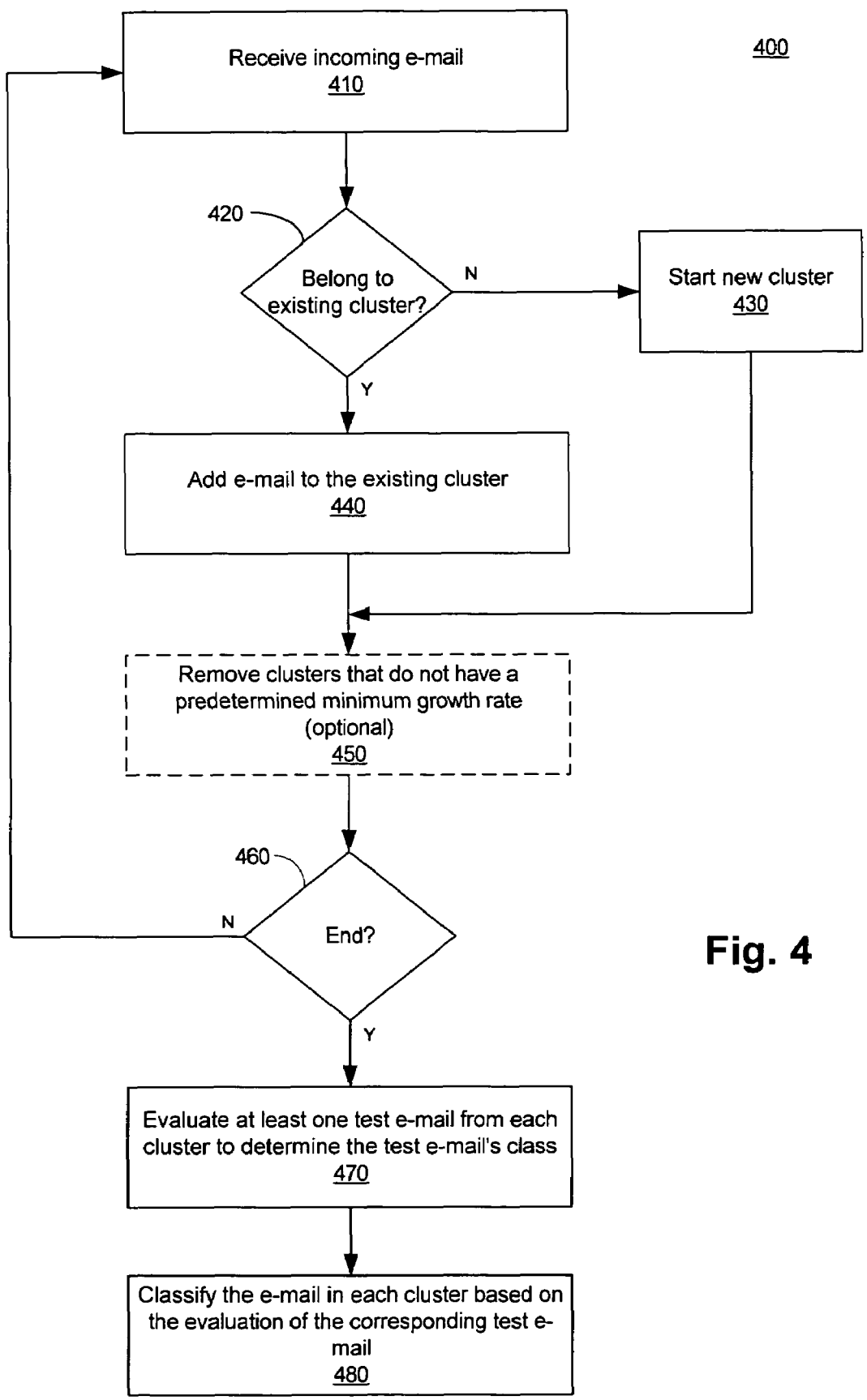
FIG. 4 is a flowchart showing one manner in which the e-mail filter of FIG. 3 may be operated to classify e-mail.

FIG. 4 is a flowchart showing one manner 400 in which e-mail filter 232 may be operated to classify e-mail. E-mail filter 232 receives incoming e-mails (410). When e-mail filter 232 receives an incoming e-mail 310, e-mail grouper 320 determines whether the e-mail belongs to an existing cluster of substantially similar e-mails (420). If the e-mail does not belong to an existing cluster, the e-mail is used to start a new cluster (430). If the e-mail belongs to an existing cluster, the e-mail is added to the cluster (440). Thus, as incoming e-mails are received, they are grouped into clusters of substantially similar e-mails. Optionally, clusters that do not experience a predetermined minimum growth rate may be eliminated (450). Doing so may conserve on storage and computing resources. In addition, not meeting a minimum growth rate is an indication that e-mails of that cluster are not spam.

At the end of a certain amount of time (either predetermined or adaptively determined) or when a certain number (either predetermined or adaptively determined) of incoming e-mails have been received (460), classifier 330 evaluates at least one test e-mail from each cluster of substantially similar e-mails to classify the test e-mail (470). Classifier 330 communicates the determined class of each test e-mail to e-mail grouper 320. E-mail grouper 320 then classifies the e-mails in each cluster of substantially similar e-mails based on the class of the test e-mail for that cluster (480). For example, if a single test e-mail from a cluster is evaluated and the test e-mail is classified as a spam e-mail, the other e-mails in the cluster are classified and labeled as spam without being evaluated.

Figure 5:
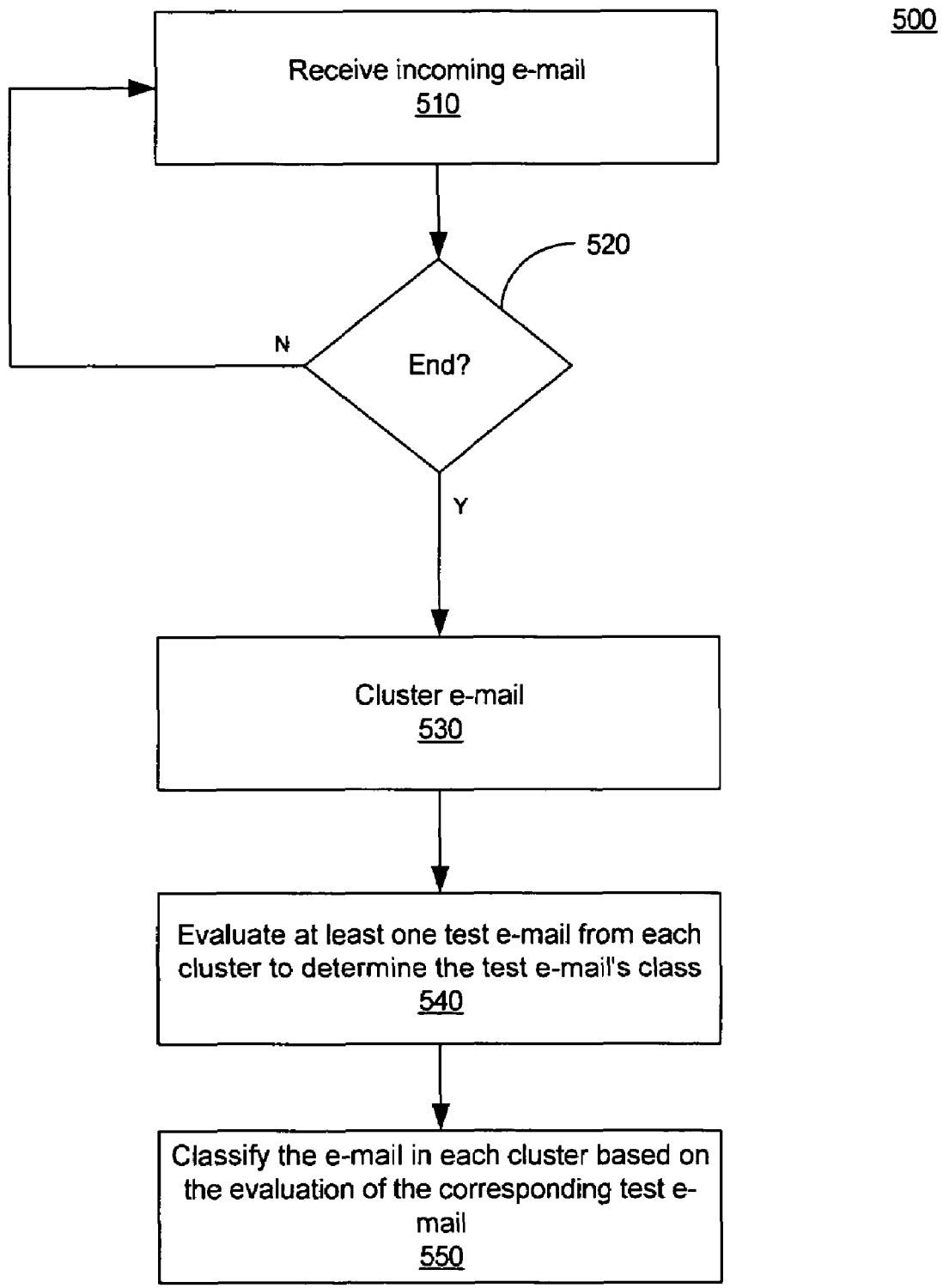
FIG. 5 is a flowchart showing an alternate manner in which the e-mail classifier of FIG. 3 may be operated to classify e-mail.

FIG. 5 is a flowchart showing an alternate manner 500 in which e-mail filter 232 may be operated to classify e-mail. E-mail filter 232 receives and stores incoming e-mails (510) until the end of a predetermined amount of time or when a predetermined number of incoming e-mails have been received (520). E-mail grouper 320 then groups the received e-mail into clusters of substantially similar e-mails (530). After the e-mails are clustered, classifier 330 evaluates at least one test e-mail from each cluster to classify the test e-mail (540). Classifier 330 communicates the determined class of each test e-mail to e-mail grouper 320, which classifies the e-mails in each cluster based on the class of the corresponding test e-mail (550).

Figure 6:
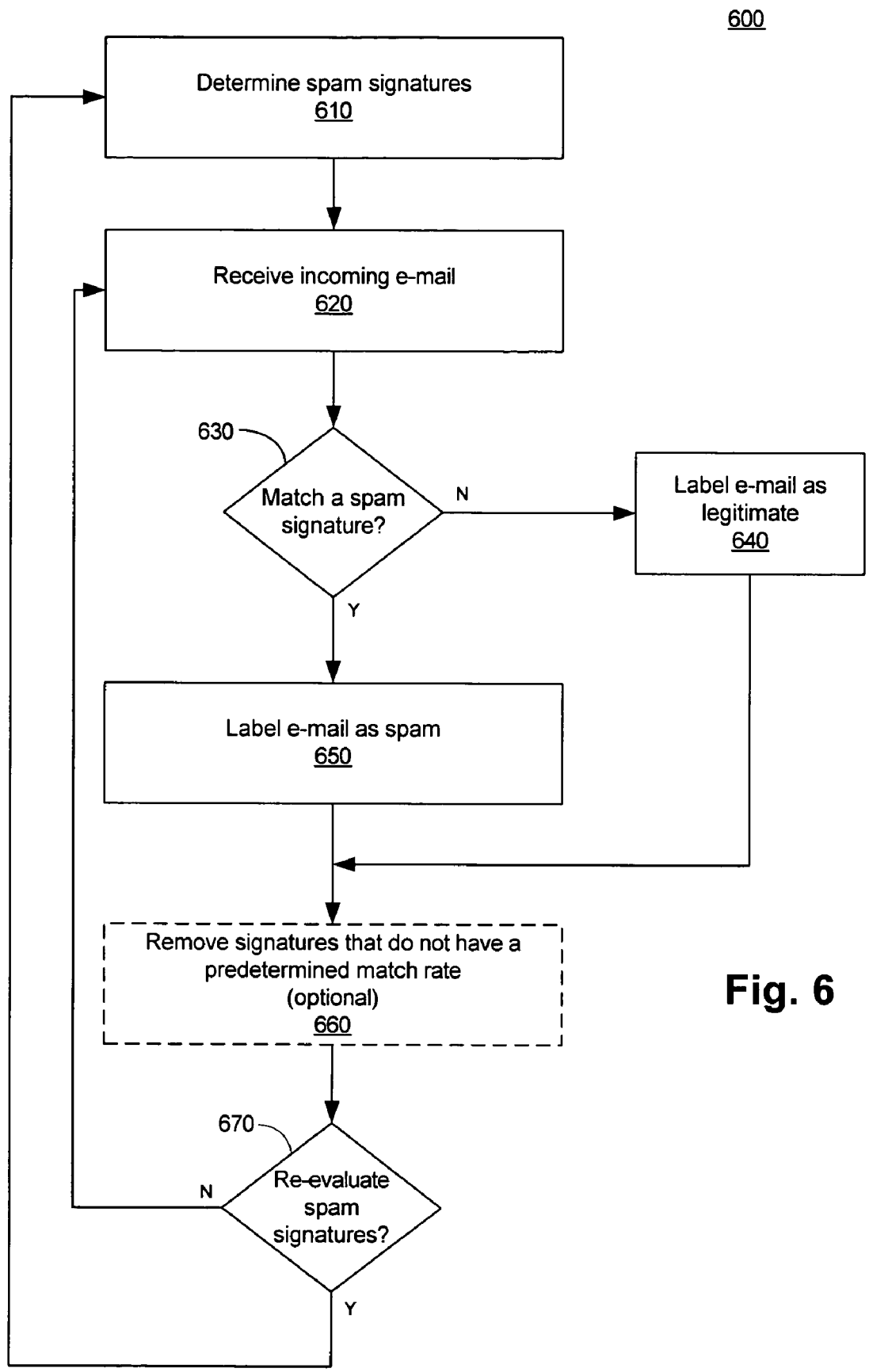
FIGS. 6 and 7 are flowcharts showing another alternate manner in which the e-mail classifier of FIG. 3 may be operated to classify e-mail.
Figure 7:
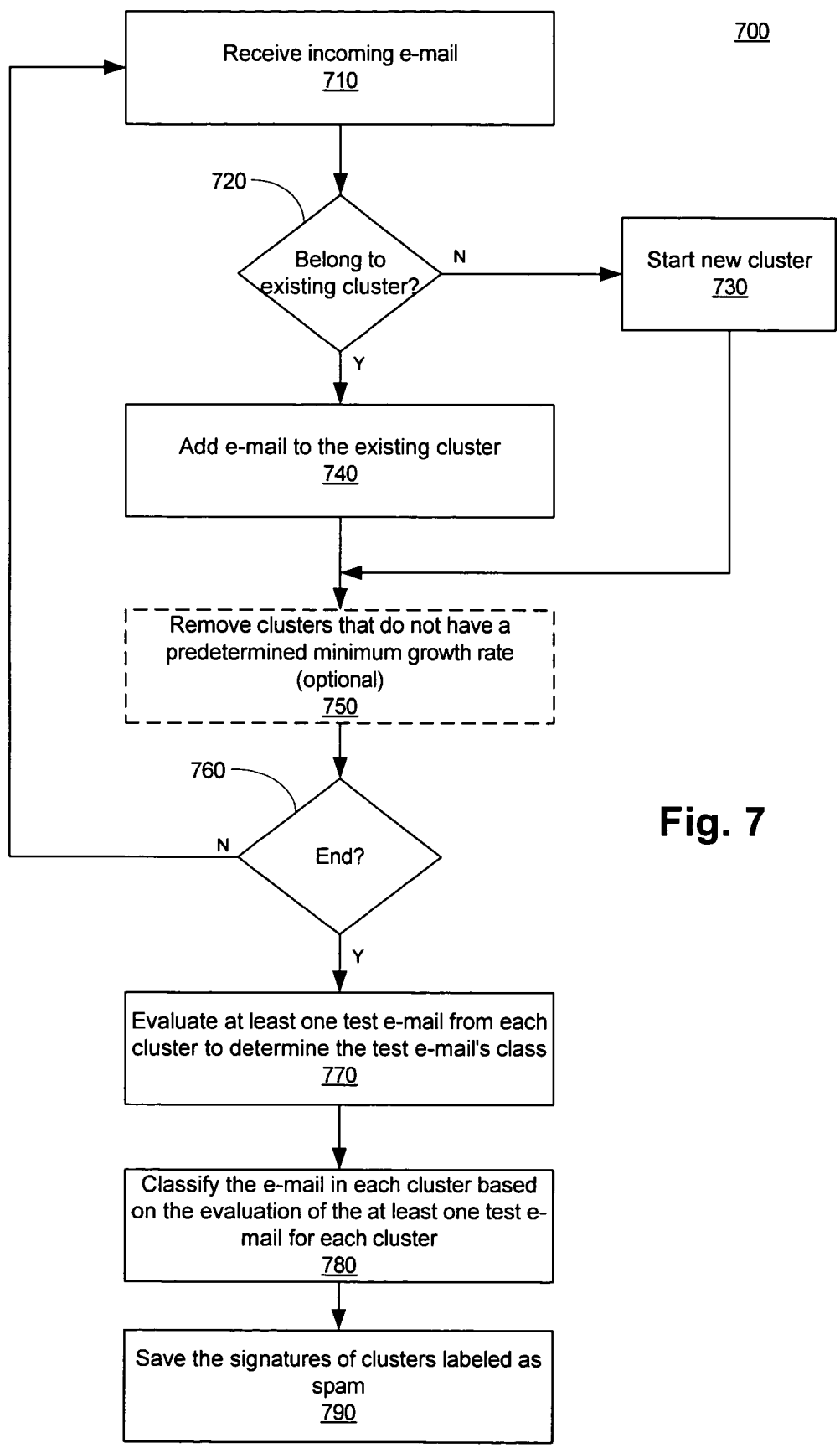

FIGS. 6 and 7 are flowcharts showing another alternate manner in which e-mail filter 232 may be operated to classify e-mail. In general, e-mail grouper 320 groups received e-mail into clusters and classifier 330 classifies at least one test e-mail from each cluster. Each cluster is then classified as spam or legitimate based on the classification of the corresponding test e-mail. For those clusters that are classified as spam, a signature of the cluster is saved. If, for example, e-mail grouper 320 uses fingerprint techniques, the signature may be a fingerprint. Likewise, if e-mail grouper 320 uses similarity techniques, the signature may be an e-mail from the cluster. When a new e-mail is received, e-mail grouper 320 uses the signatures of the spam clusters to determine if the new e-mail belongs to any of those spam clusters. The new e-mail is classified as spam if its signature corresponds to a signature of a spam cluster and otherwise is classified as legitimate.

Specifically, referring to FIG. 6, after the spam signatures are determined (610), incoming e-mail 310 is received. As an e-mail is received, e-mail grouper 320 analyzes the e-mail using the spam signatures to determine if the e-mail belongs to any of the spam clusters (i.e., is a substantially similar to the e-mails in a cluster determined to be spam) (630). For example, if e-mail grouper 320 uses fingerprint techniques, the e-mail grouper may determine the fingerprint of the received e-mail and determine whether the fingerprint matches any of the spam fingerprints saved as spam signatures. Alternatively, for example, e-mail grouper 320 may use similarity techniques to compare the received e-mail to spam e-mails saved as signatures of the spam clusters to determine if the received e-mail matches any of the spam e-mails. If the received e-mail does not belong to a spam cluster, e-mail grouper 320 labels the e-mail as legitimate or as an unknown signature (640). If the e-mail does belong to a spam cluster, the e-mail is labeled as spam (650).

Optionally, signatures that do not experience a predetermined match rate may be eliminated (660). Doing so may conserve on storage and computing resources. Alternatively, such signatures may be labeled as bulk mail (but not spam) signatures.

The spam signatures may be re-evaluated after a certain period of time or number of received e-mails. At the end of the time period, or when the threshold number of e-mails has been received (670), new spam signatures are determined (610).

FIG. 7 is a flow chart showing a process 700 for determining the spam signatures. E-mail filter 232 receives incoming e-mails (710). When e-mail filter 232 receives an incoming e-mail 310, e-mail grouper 320 determines whether the e-mail belongs to an existing cluster of substantially similar e-mails (720). If the e-mail does not belong to an existing cluster, the e-mail is used to start a new cluster (730). If the e-mail belongs to an existing cluster, the e-mail is added to the cluster (740). Thus, as incoming e-mails are received, they are grouped into clusters of substantially similar e-mails.

Optionally, clusters that do not experience a predetermined minimum growth rate may be eliminated (750).

At the end of a certain amount of time or when a certain number of incoming e-mails have been received (760), classifier 330 evaluates at least one test e-mail from each cluster of substantially similar e-mails to determine the class of the test e-mail (770). Classifier 330 communicates the determined class of each test e-mail to e-mail grouper 320, which then labels the e-mails in each cluster of substantially similar e-mails based on the class of the test e-mail (780). E-mail grouper 320 also stores the signatures of the clusters that are determined to be spam (790).

Reducing Overall System Costs

By clustering incoming e-mail 310 into groups of substantially similar e-mails and making classification decisions only on a subset of the e-mails in each group, the overall system costs may be reduced. Generally, given a set cost $\eta$ for performing duplicate detection on an e-mail, there are two primary sources of cost that affect the overall system costs when classifying e-mail using e-mail filter 232. The first source is the cost of classifying e-mails (i.e., the classification costs). Classification costs may be in terms of, for example, computing power used, time needed to classify the e-mails, additional hardware, software, personnel, or maintanence, and may depend on the type of classifier used.

The second source is the misclassification costs. Misclassification costs occur when spam e-mails are misclassified as legitimate and when legitimate e-mails are misclassified as spam. For example, for the e-mail service provider, misclassifying spam e-mail as legitimate results in additional storage costs, which might become fairly substantial. In addition, failure to adequately block spam may result in dissatisfied customers, which may result in the customers abandoning the service. The cost of misclassifying spam as legitimate, however, may generally be considered nominal when compared to the cost of misclassifying legitimate e-mail as spam, particularly when the policy is to delete or otherwise block the delivery of spam e-mail to the e-mail user. Losing an important e-mail may mean more to a customer than mere annoyance. Cost, therefore, may take into account factors other than just monetary terms.

In addition to a variation in misclassification costs between misclassifying spam as legitimate e-mail and legitimate e-mail as spam, there may be a variation in the costs of misclassifying different categories of legitimate e-mail as spam. For instance, misclassifying personal e-mails may incur higher costs than misclassifying work related e-mails. Similarly, misclassifying work related e-mails may incur higher costs than misclassifying e-commerce related e-mails, such as order or shipping confirmations.

If the classification cost of classifying a single e-mail is $\omega$, then the classification costs of classifying N incoming e-mails is N·$\omega$. If e-mail grouper 320 accurately detects substantially similar duplicates of each unique e-mail in incoming e-mail stream 310, then the e-mails in incoming e-mail stream 310 can be accurately clustered into C clusters of unique e-mails, where C<N and, possibly, C<<N. Then, in theory, classification costs may be reduced to C·$\omega$ by having classifier 330 classify a single e-mail from each cluster. At the same time, if classifier 330 accurately classifies the test e-mails, then misclassification costs will be zero. This would result in an overall system cost of C·$\omega$+N·$\eta$. This cost model is an exemplary linear cost model. Other cost models, either linear or more complex functional forms, may be used.

In practice, perfect classification and duplicate detection may not be possible. Thus, while e-mail filter 232 still may be designed to reduce the overall system costs, the amount of the overall costs may not be as low as C·$\omega$+N·$\eta$. The actual overall system costs depend on the accuracy of classifier 330 and the accuracy of e-mail grouper 320.

Generally, the accuracy of classifier 330 and the accuracy of e-mail grouper 320 may affect the overall system costs in three ways. First, the accuracy of classifier 330 may affect the total system costs by increasing the misclassification cost. A very accurate classifier, however, may be used to minimize misclassification costs resulting from the classifier 330. The reduction in the number of e-mails classified may be used to offset an increase in the costs per classification, $\omega$. This allows a more accurate classifier (which may be more costly) to be used for classifier 330 to reduce the misclassification costs resulting from classifier 330.

Second, an inaccurate e-mail grouper 320 may increase the number of clusters identified to K, where K>C. This increases the total classification costs because classifier 330 needs to be used more than necessary. Choosing a more accurate e-mail grouper 320 that minimizes K may reduce these effects. It should be noted that choosing a more accurate e-mail grouper 320 may result in an increased cost $\eta$ for performing duplicate detection Third, an inaccurate e-mail grouper 320 may affect the total cost by mapping non-identical messages onto the same cluster (in which case the cluster is considered impure). Impure clusters affect the overall system costs by increasing the misclassification costs. If classifier 330 is used to evaluate a single test e-mail from a cluster, then classifying the other e-mails in the cluster based on the classifier's decision will incur a misclassification cost if any other members of the cluster belong to another class. The magnitude of the misclassification costs incurred for the cluster depends on the number of e-mails that belong to another class.

The expected misclassification costs incurred for this situation can be quantified in the following way. In particular, when $n_k$ denotes the number of elements in the kth cluster and $pos_k$ and $neg_k$ represent the number of legitimate and spam e-mails, respectively, contained in the kth cluster ($neg_k/n_k$=1−$pos_k/n_k$), the expected misclassification cost $L_k^m$ incurred by deciding the cluster's class-membership after evaluating a single e-mail in the cluster is:

$$L_k^m = \frac{pos_k}{n_k} \cdot neg_k + \frac{neg_k}{n_k} \cdot \text{cost} \cdot pos_k = \frac{pos_k \cdot neg_k}{n_k}(1 + \text{cost})$$

where cost is the ratio of the cost of misclassifying legitimate e-mails as spam to the cost of misclassying spam e-mails as legitimate. Given that K clusters are present, the expected overall system cost $L_k$ is (assuming negligible misclassification costs due to classifier 330):

$$L_k = K \cdot \omega + \sum_{k=1}^{K} \frac{pos_k \cdot neg_k}{n_k}(1 + \text{cost}) + N \cdot \eta$$

Misclassification costs due to cluster impurity may be reduced in two ways. First, choosing a more accurate e-mail grouper may reduce the expected misclassification costs because there generally will be fewer e-mails of another class in a given cluster. To decrease misclassification costs from impure clusters, a e-mail grouper that is more accurate in an absolute sense (i.e., one that reduces cluster impurity) does not need to be chosen. Rather, a e-mail grouper that is more accurate with respect to not mixing classes may be used. In other words, one may reduce misclassification costs by using a e-mail grouper that mixes non-substantially similar e-mails in a cluster, as long as the mixed e-mails all belong to the same class (e.g., spam). In optimization terminology, it is desired to maximize duplicate detection subject to minimizing the chance of mixing class labels within a cluster while satisfying run-time performance constraints. Using a e-mail grouper that is more accurate with respect to class mixing, rather than cluster impurity, may decrease the misclassification costs without incurring an increase in the cost $\eta$ for performing duplicate detection.

To choose such a e-mail grouper, the typical duplicate detector accuracy measures may be modified such that errors affecting objects of the same class are de-emphasized. Duplicate detector accuracy is typically measured based on one of two perspectives: the clustering perspective (i.e., explicitly clustering all documents into groups of duplicate documents) or the pairing perspective (i.e., computing pairwise document-to-document similarity).

From the clustering perspective, the accuracy measure may be modified by measuring impurity of the clusters with respect to the two classes, instead of measuring the impurity with respect to C unique documents. This may be done, for example, by using a measure such as $$\sum_{k=1}^{K} \frac{n_k}{N} \frac{pos_k \cdot neg_k}{n_k}.$$

As an alternative, a winner-take-all strategy may be used to assign class labels to clusters, with the majority class providing the winner. In this case, the F-measure for detecting the minority class (detecting the minority class usually provides more conservative accuracy estimates) among the N objects being clustered could be used to assess the degree of class mixing. The F-measure is a well known measure of classifier performance.

From the pairing perspective, the F-measure may be modified such that precision is measured as $$\frac{\text{\# correctly identified pairs}}{\text{\# correctly identified pairs} + \text{\# incorrectly identified pairs of mixed class membership}}$$

instead of the standard definition of $$\frac{\text{\# correctly identified pairs}}{\text{\# correctly identified pairs} + \text{\# incorrectly identified pairs}}$$

Alternatively, a receiver operating characteristic analysis (ROC), which is distribution independent in the pairing context, may be used. This analysis uses the normal true-positive (TP) rate, defined as:

$$\frac{\text{\# correctly identified pairs}}{\text{\# correct pairs}}$$

Normally, the false-positive (FP) rate is defined as:

$$\frac{\text{\# incorrectly identified pairs}}{\text{\# incorrect pairs}}$$

But instead of FP, a false positive rate FPc may be used. FPc de-emphasizes the false positives where both objects in a pair belong to the same class. FPc is defined as:

$$\frac{\text{\# incorrectly identified pairs}}{\text{\# incorrect pairs of mixed class membership}}$$

This can be seen as an extreme case of stratified sampling sometimes used in ROC analysis when misclassification costs for different types of objects with the same class are different. In such cases, errors (i.e., false positive counts) corresponding to objects of different types are weighted in proportion to their misclassification cost.

The difficulty of using ROC analysis as a performance metric is that ROC is a curve in the FP-TP or FPc-TP coordinates, with different points on the curve corresponding to different settings of the detection algorithm. Not all duplicate detectors allow for smooth changes of control settings, but even if a duplicate detector produces just one point in the ROC space, a full curve is produced by joining it with points (0,0) and (1,1). There may be regions in the ROC space where one duplicate detector outperforms another, with the relationship reversed in another region. As a result, careful analysis may be required to examine the relative merits of different classification techniques.

Recently many researchers have advocated the use of the area under the ROC curve (AUC) as a single measure characterizing the quality of a classifier. AUC can vary between 0 and 1 (the optimum), with values below 0.5 indicating that the classifier performs worse than random guessing. An AUC measure based on a modified ROC as described above also may be used to choose a duplicate detector that is more accurate with respect to not mixing classes.

The second way of reducing misclassification costs due to cluster impurity involves evaluating more than one test e-mail for the clusters and making the classification decision for the clusters based on the proportions of spam e-mails and legitimate e-mails in the multiple test e-mails. This second method allows the optimum decision (i.e., the one which results in the minimum misclassification costs) to be made for a given cluster.

The optimum decision may be made for a cluster by evaluating every e-mail in the cluster to determine the number of spam e-mails in the cluster, $neg_k$, and the number of legitimate e-mails in the cluster, $pos_k$. The e-mails in the cluster then are labeled as spam when $neg_k > cost \cdot pos_k$, otherwise they are labeled as legitimate. Classifying clusters in this manner insures the minimum expected misclassification costs $L_k^m$ is incurred. The expected misclassification cost incurred for the cluster is:

$$L_k^m = \min(neg_k, cost \cdot pos_k)$$

However, evaluating every e-mail in the clusters increases the classification costs to N·ω. Thus, the expected overall system cost $L_k$ becomes:

$$L_k = N \cdot \omega + \sum_{k=1}^{K} \min(neg_k, \text{cost} \cdot pos_k) + N \cdot \eta$$

The optimum decision, however, can be estimated without incurring the additional costs of evaluating all e-mails. If s e-mails (where $s<n_k$) from the kth cluster are classified by classifier 330, that information may be used to estimate the fraction of spam and legitimate messages in the cluster. If this is a fairly accurate estimate, then a decision made based on the classes of the s e-mails will be the optimum decision.

More specifically, let i be the number of spam messages in a s-element set of test e-mails and let s−i be the number of legitimate e-mails in the sample. The optimum decision then may be approximated by labeling a cluster as spam if i>cost·(s−i) and as legitimate otherwise.

In this case, the probability of labeling a cluster as spam is:

$$P(\text{decision} = \text{spam}|s, n_k) = \sum_{i=0}^{\min(s,n_k)} [i > \text{cost} \cdot (s-i)] \binom{neg_k}{i} \binom{n_k - neg_k}{s-i} \bigg/ \binom{neg_k}{s}$$

with:

$P(\text{decision}=\text{legitimate}|s, n_k)=1-P(\text{decision}=\text{spam}|s, n_k)$ As a result, the expected misclassification costs $L_k^m$ incurred by deciding the cluster's class-membership after evaluating s e-mails in the cluster is:

$L_k^m = P(\text{decision}=\text{legitimate}|s, n_k)\cdot neg_k + P(\text{decision}=\text{spam}|s, n_k)\cdot \text{cost}\cdot pos_k$ And the classification costs only increase to s·ω per cluster. Thus, when s e-mails per cluster are evaluated (and all e-mails in the cluster are evaluated when $n_k \leq s$ ), the expected overall system cost $L_k$ becomes:

$$L_k = \sum_{k=1}^{K} \min(s, n_k) \cdot \omega + P(\text{decision} = \text{legitimate}| s, n_k) \cdot neg_k + P(\text{decision} = \text{spam}| s, n_k) \cdot \text{cost} \cdot pos_k + N \cdot \eta$$

with:

$$P(\text{decision} = \text{spam}|s, n_k) = \sum_{i=0}^{\min(s,n_k)} [i > \text{cost} \cdot (s-i)] \binom{neg_k}{i} \binom{n_k - neg_k}{s-i} \bigg/ \binom{neg_k}{s}$$

The decision of how many test e-mails should be examined depends on the accuracy of e-mail grouper 320. The cost model and cluster size determine the threshold in the range of $$\frac{pos_k}{n_k}$$

at which the cluster should be classified as legitimate or spam. By knowing the expected value of $$\frac{pos_k}{n_k}$$

of e-mail grouper 320 (i.e., the expected impurity), one can determine the number of samples, s, at which the measured proportions of spam and legitimate e-mail approaches the actual values in the cluster within a desired confidence level.

When e-mail filter 232 is operated in the manner illustrated by FIGS. 6 and 7, the overall costs actually experienced during operation may differ significantly from the expected overall costs, even when the optimum decision is made for the clusters. When the signature of an M element cluster is used to classify future e-mails, as in the technique illustrated by FIGS. 6 and 7, the cluster is representative of a larger population of e-mails with the same signature (i.e., the future received e-mails with the same signature). While the optimum decision described above will yield the least misclassification costs for a cluster, the decision may not yield the least misclassification costs with respect to the larger population, particularly if the measured proportion of spam content in the cluster differs significantly from the proportion in the larger population of e-mails. This effect can be corrected for by choosing a cluster size for which the proportion in the clusters is a fairly accurate representation of the true proportion.

To facilitate the following discussion regarding choosing a cluster size, the optimum decision described above will be expressed in terms of proportions. If p denotes the proportion of a cluster's elements found to be spam, assuming the cost of misclassifying spam as unity and the cost of misclassifying legitimate email as cost, the optimum decision for the cluster's class would be to assign the whole cluster to the spam class if $p > (1-p) \cdot \text{cost}$, which yields the classification threshold t of $$t = \frac{\text{cost}}{\text{cost}+1}.$$

In other words, when the proportion of spam e-mail in a cluster exceeds t, the cluster should be assigned the spam class. Note that the value of t automatically determines the lowest acceptable impurity level of e-mail grouper 320. If the e-mail grouper 320 included, on average, more than M·(1−t) legitimate emails per cluster, where M is the number of e-mails in a cluster, none of the clusters would ever be filtered, so all of the spam would come though.

Classical statistical techniques may be applied to determine the cluster size M for which the estimate of the proportion is reliable. Let π denote the expected spam proportion of a cluster and let d be the target precision with which the cluster proportion should reflect the true proportion. Given a normal approximation to the sampling distribution of a proportion, the required sample size is estimated as:

$$M \geq \frac{z_\alpha^2 \pi (1-\pi)}{d^2}.$$

where $z_\alpha$ is the standard normal deviate corresponding to the desired reliability or confidence level that the measured proportion reflects the actual proportion. The desired reliability of the estimate is expressed as $(1-\alpha)$. Thus, for example, if one wanted the measured proportion to accurately reflect (within the target precision d) the actual proportion 99% of the time, then $\alpha=0.01$ and $z_\alpha=2.33$.

To determined the appropriate cluster size M, appropriate values for the desired reliability, $\alpha$, the expected spam proportion, $\pi$, and the target precision, d, need to be chosen. The value of $\alpha$ determines the probability of the type-I error, which in the present case is the probability of making the suboptimal decision of classifying the whole cluster (and all future emails bearing the same signature) as spam, when in fact the true proportion of spam in the cluster is less than t. In many statistical estimation situations, $\alpha$ is simply chosen to be one of two "standard" values: 0.05 or 0.01. However, one possible way to choose a more appropriate $\alpha$ in the present case is to make the expected increase in misclassification costs due to misclassifying legitimate e-mail significantly lower than the increase due to misclassifying spam e-mail (e.g., by making $\alpha \cdot \text{cost} \ll 1$, assuming a cost of one for misclassifying spam). For instance, in a system where cost=100 and the cost of misclassifying spam is one, $\alpha$ may be chosen to be 0.001.

In general, the expected spam proportion for a cluster that should be classified as a spam cluster would be higher than the threshold t. However, since the spam proportion of a cluster should be at least as high as t for the cluster to be classified as spam, $\pi=t$ provides a conservative estimate of the expected proportion of spam in a cluster.

The target precision d determines the threshold spam proportion at which a cluster is classified as spam. The target precision d represents how much the measured proportion of the cluster may vary from the actual proportion. That is, the actual proportion may be d less than the measured proportion. Thus, to insure that a cluster is not classified as spam when the actual proportion of spam is actually less than t, the cluster classification decision should be made based on t+d (i.e., the cluster is classified as spam when p>t+d).

The target precision d may be chosen to help avoid the higher costs of misclassifying legitimate e-mail. For example, d may be chosen to insure that a cluster is classified as spam only when the cost of misclassifying spam outweighs the cost of misclassifying legitimate e-mails by some ratio, R (e.g., R=2). In this case, a cluster would be classified as spam when:

$$p > R \cdot (1-p) \cdot \text{cost},$$

which yields the classification threshold of:

$$t_R = \frac{R \cdot \text{cost}}{R \cdot \text{cost} + 1}.$$

Setting the target precision d to $t_R - t$ then insures that a cluster is classified as spam only when the cost of misclassifying spam outweighs the cost of misclassifying legitimate e-mails by the ratio R.

The following table provides a numeric example. The precision level is calculated as described above with R=2 and the expected proportion $\pi$ is equal to t.

| cost | $\alpha$ | $z_\alpha$ | t | M |
|---|---|---|---|---|
| 10 | 0.01 | 2.33 | 0.91 | 240 |
| 100 | 0.001 | 3.08 | 0.99 | 3,833 |

Generally, the probability of error decreases for larger values of M, so the values provided by an analysis such as this one may represent the lower bounds, with the higher bounds given by the memory resources available and also by the length of the time window in which e-mails are clustered (for very large values of M, it is possible that only a few of the total clusters will be filled in a reasonable amount of time).

The threshold t used in arriving at the value of M does not necessarily have to be used by e-mail filter 232 during classification. In particular, for e-mail groupers 320 characterized by very low class impurity, a less restrictive value of t may be used during classification if $\pi(1-\pi)$ is set according to the expected class impurity instead of t. Also, if the cost model and reliability (i.e., $\alpha$) change, the classification threshold might need to be readjusted.

The foregoing description describes a particular analysis for reducing overall system costs. This analysis can be generalized or changed as appropriate depending on the system to which it is applied. For example, different cost models may be developed for different systems, which may change the analysis.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, a number of places in the foregoing description described an action as performed on each e-mail in a group or each group; however, the performance of the actions on each e-mail or each group is not required.

Also for instance, the foregoing description primarily discussed two classes, spam and non-spam. However, the techniques may be applied to design an e-mail classifier that classifies e-mail into more than two classes such as, for example, spam e-mail, bulk e-mail, and personal e-mail.

As yet another example, the foregoing description has described an e-mail classifier that labels mail for handling by a mail handler. However, in some implementations, it may not be necessary to label e-mail at all. For instance, e-mail filter 232 may be designed to appropriately handle e-mail in a group based on the classification of the test e-mails. Likewise, in other implementations, it may not be necessary to label all classes of e-mail. For example, the mail handler may be designed to only act on certain classes of e-mail and just deliver non-labeled e-mail. Thus, only e-mail in the certain classes would need to be labeled.

Accordingly, implementations other than those specifically described are within the scope of the following claims.

What is claimed is:

1. A method of classifying e-mail as spam, the method comprising:
    receiving multiple e-mails, wherein each received e-mail includes a header portion and a content portion;
    storing the received e-mails;
    analyzing the content portions of the stored e-mails to cluster the stored e-mails into multiple groups of substantially duplicate e-mails;
    storing the multiple groups of substantially duplicate e-mails;
    for at least one of the stored groups, selecting a set of one or more test e-mails from that group;
    determining a proportion of spam e-mails in the selected set of test e-mails;
    comparing the proportion of spam e-mails to a threshold proportion to determine whether the proportion of spam e-mails exceeds the threshold;
    if the comparison indicates that the proportion of spam e-mails in the selected set of test e-mails exceeds the threshold proportion, classifying the e-mails in the at least one stored group as spam; and
    if the comparison indicates that the proportion of spam e-mails in the selected set of test e-mails does not exceed the threshold proportion, classifying the e-mails in the at least one stored group as non-spam.

2. The method of claim 1 wherein selecting the set of one or more test e-mails comprises selecting a sufficient number of test e-mails for the set such that the proportion of spam e-mails in the set accurately reflects a proportion of spam e-mails in the at least one stored group.

3. The method of claim 1 wherein analyzing the content portions of the stored e-mails to cluster the stored e-mails into multiple groups of substantially duplicate e-mails comprises:
    performing duplicate detection on the stored e-mails to cluster the stored e-mails into groups of substantially duplicate e-mails.

4. The method of claim 1 wherein analyzing the content portions of the stored e-mails to cluster the stored e-mails into groups of substantially duplicate e-mails comprises:
    performing duplicate detection on a received e-mail when the e-mail is received to determine if the received e-mail is a substantially duplicate of e-mails in an existing group of substantially duplicate e-mails;
    adding the received e-mail to the existing group of substantially duplicate e-mails when the received e-mail is a substantial duplicate of e-mails in the existing group; and
    using the received e-mail to start a new group of substantially duplicate e-mails when the received e-mail is not a substantial duplicate of e-mails in the existing group of substantially duplicate e-mails.

5. The method of claim 1 further comprising:
    saving a signature of the at least one group when the proportion of spam e-mails in the selected set of test e-mails exceeds the predetermined threshold proportion;
    receiving a new e-mail;
    using the signature to determine whether the new e-mail is a substantial duplicate of the e-mails in the at least one group;
    classifying the new e-mail as spam when the new e-mail is a substantial duplicate of the e-mails in the at least one group.

6. The method of claim 5 wherein the substantially duplicate e-mails in the at least one stored group are part of a larger population of substantially duplicate e-mails, the method further comprising selecting a size for the at least one stored group such that a proportion of spam e-mails in the at least one stored group accurately reflects a proportion of spam e-mails in the larger population.

7. The method of claim 1 wherein the threshold proportion is based on a misclassification cost of misclassifying spam e-mail as non-spam e-mail and a misclassification cost of misclassifying non-spam e-mail as spam e-mail.

8. The method of claim 1, further comprising handling the e-mails classified as spam.

9. The method of claim 8 wherein handling the e-mails classified as spam comprises deleting the e-mails classified as spam.

10. The method of claim 8 wherein handling the e-mails classified as spam comprises marking the e-mails as spam and forwarding the marked e-mails to a recipient specified by the marked e-mail.

11. A computer storage medium having a computer program embodied thereon for classifying e-mail as spam, the computer program comprising instructions for causing a computer to perform the following operations:
    receive multiple e-mails, wherein each received e-mail includes a header portion and a content portion;
    store the received e-mails;
    analyze the content portions of the stored e-mails to cluster the stored e-mails into multiple groups of substantially duplicate e-mails;
    store the multiple groups of substantially duplicate e-mails;
    for at least one of the stored groups, select a set of one or more test e-mails from that group;
    determine a proportion of spam e-mails in the selected set of test e-mails;
    compare the proportion of spam e-mails to a threshold proportion to determine whether the proportion of spam e-mails exceeds the threshold;
    if the comparison indicates that the proportion of spam e-mails in the selected set of test e-mails exceeds the threshold proportion, classify the e-mails in the at least one stored group as spam; and
    if the comparison indicates that the proportion of spam e-mails in the selected set of test e-mails does not exceed the threshold proportion, classify the e-mails in the at least one stored group as non-spam.

12. The computer storage medium of claim 11 wherein, to select the set of one or more test e-mails, the computer program further comprises instruction for causing a computer to select a sufficient number of test e-mails for the set such that the proportion of spam e-mails in the set accurately reflects a proportion of spam e-mails in the at least one stored group.

13. The computer storage medium of claim 11 wherein, to analyze the content portions of the stored e-mails to cluster the stored e-mails into multiple groups of substantially duplicate e-mails, the computer program further comprises instruction for causing a computer to:
    perform duplicate detection on the set of stored e-mails to cluster the stored e-mails into groups of substantially duplicate e-mails.

14. The computer storage medium of claim 11 wherein, to analyze the content portions of the stored e-mails to cluster the stored e-mails into groups of substantially duplicate e-mails, the computer program further comprises instruction for causing a computer to:

perform duplicate detection on a received e-mail when the e-mail is received to determine if the received e-mail is a substantial duplicate of e-mails in an existing group of substantially duplicate e-mails;

add the received e-mail to the existing group of substantially duplicate e-mails when the received e-mail is a substantial duplicate of e-mails in the existing group; and use the received e-mail to start a new group of substantially duplicate e-mails when the received e-mail is not a substantial duplicate of e-mails in the existing group of substantially duplicate e-mails.

15. The computer storage medium of claim 11 wherein the computer program further comprises instruction for causing a computer to:

save a signature of the at least one group when the proportion of spam e-mails in the selected set of test e-mails exceeds the threshold proportion;

receive a new e-mail;

use the signature to determine whether the new e-mail is a substantial duplicate of the e-mails in the at least one group;

classify the new e-mail as spam when the new e-mail is a substantial duplicate of the e-mails in the at least one group.

16. The computer storage medium of claim 15 wherein the substantially duplicate e-mails in the at least one stored group are part of a larger population of substantially duplicate e-mails, computer program further comprises instruction for causing a computer to select a size for the at least one stored group such that a proportion of spam e-mails in the at least one stored group accurately reflects a proportion of spam e-mails in the larger population.

17. The computer storage medium of claim 11 wherein the threshold proportion is based on a misclassification cost of misclassifying spam e-mail as non-spam e-mail and a misclassification cost of misclassifying non-spam e-mail as spam e-mail.

18. An apparatus for classifying e-mail as spam, the apparatus comprising:

one or more processors and a computer-readable medium coupled to the one or more processors, the medium storing instructions which, when executed by the one or more processors, cause the one or more processors to perform operations comprising:

receiving multiple e-mails, wherein each received e-mail includes a header portion and a content portion;

storing received e-mails;

analyzing the content portions of the stored e-mails to cluster the stored e-mails into multiple groups of substantially duplicate e-mails;

storing the multiple groups of substantially duplicate e-mails;

for at least one of the groups, selecting a set of one or more test e-mails from that group;

determining the proportion of spam e-mails in the set of test e-mails; and comparing the proportion of spam e-mails to a threshold proportion to determine whether the proportion of spam e-mails exceeds the threshold; and means for classifying the e-mails in the at least one stored group as spam if the comparison indicates that the proportion of spam e-mails in the selected set of test e-mails exceeds the threshold proportion, and means for classifying the e-mails in the at least one stored group as non-spam if the comparison indicates that the proportion of spam e-mails in the selected set of test e-mails does not exceed the threshold proportion.

19. The apparatus of claim 18 wherein selecting the set of one or more test e-mails comprises selecting a sufficient number of test e-mails for the set such that the proportion of spam e-mails in the set accurately reflects a proportion of spam e-mails in the at least one stored group.

20. The apparatus of claim 18 wherein analyzing the content portions of the stored e-mails to cluster the stored e-mails into groups of substantially duplicate e-mails comprises:

performing duplicate detection on the set of stored e-mails to cluster the set of stored e-mails into groups of substantially duplicate e-mails.

21. The apparatus of claim 18 wherein analyzing the content portions of the stored e-mails to cluster the stored e-mails into groups of substantially duplicate e-mails comprises:

performing duplicate detection on a received e-mail when the e-mail is received to determine if the received e-mail is a substantial duplicate of e-mails in an existing group of substantially duplicate e-mails;

adding the received e-mail to the existing group of substantially duplicate e-mails when the received e-mail is a substantial duplicate of e-mails in the existing group; and using the received e-mail to start a new group of substantially duplicate e-mails when the received e-mail is not a substantial duplicate of e-mails in the existing group of substantially duplicate e-mails.

22. The apparatus of claim 18 further comprising:

saving a signature of the at least one group when the proportion of spam e-mails in the selected set of test e-mails exceeds the threshold proportion;

receiving a new e-mail;

using the signature to determine whether the new e-mail is a substantial duplicate of the e-mails in the at least one group;

classifying the new e-mail as spam when the new e-mail is a substantial duplicate of the e-mails in the at least one group.

23. The apparatus of claim 22 wherein the substantially duplicate e-mails in the at least one stored group are part of a larger population of substantially duplicate e-mails, the apparatus further comprising selecting a size for the at least one stored group such that a proportion of spam e-mails in the at least one stored group accurately reflects a proportion of spam e-mails in the larger population.

24. The apparatus of claim 18 wherein the threshold proportion is based on a misclassification cost of misclassifying spam e-mail as non-spam e-mail and a misclassification cost of misclassifying non-spam e-mail as spam e-mail.

* * * * *